US012296579B2

(12) United States Patent
las Murria de las Heras et al.

(10) Patent No.: US 12,296,579 B2
(45) Date of Patent: May 13, 2025

(54) PRINTER WITH HIGH PRODUCTIVITY MEDIA SCANNING

(71) Applicant: Electronics for Imaging, Inc., Londonderry, NH (US)

(72) Inventors: Jorge las Murria de las Heras, Almazora (ES); Ruben Gallen, Almazora (ES); Juan Escudero Gonzalez, Almazora (ES)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 459 days.

(21) Appl. No.: 17/682,148

(22) Filed: Feb. 28, 2022

(65) Prior Publication Data

US 2023/0271433 A1 Aug. 31, 2023

(51) Int. Cl.

*B41J 11/00* (2006.01)
*B41J 2/045* (2006.01)
*B41J 13/00* (2006.01)
*B41J 25/308* (2006.01)

(52) U.S. Cl.

CPC ....... *B41J 11/0095* (2013.01); *B41J 2/04556* (2013.01); *B41J 11/0035* (2013.01); *B41J 11/007* (2013.01); *B41J 13/0027* (2013.01); *B41J 25/308* (2013.01)

(58) Field of Classification Search

CPC ............... B41J 11/0095; B41J 2/04556; B41J 11/0035; B41J 11/007; B41J 13/0027; B41J 25/308

See application file for complete search history.

(56) References Cited

U.S. PATENT DOCUMENTS

| | | | | |
|---|---|---|---|---|
| 6,629,787 | B2 | 10/2003 | Lee et al. | |
| 6,755,505 | B2 | 6/2004 | Liu et al. | |
| 8,757,746 | B2 | 6/2014 | Wing et al. | |
| 8,840,214 | B2 | 9/2014 | de Jong et al. | |
| 2002/0070987 | A1 | 6/2002 | Cooper et al. | |
| 2008/0238959 | A1 * | 10/2008 | Kato | B41J 29/38 347/8 |
| 2009/0303276 | A1 | 12/2009 | Van et al. | |
| 2017/0072722 | A1 | 3/2017 | Mueller et al. | |

FOREIGN PATENT DOCUMENTS

| | | | |
|---|---|---|---|
| WO | 2017110441 | A1 | 6/2017 |

* cited by examiner

*Primary Examiner* — Henok D Legesse
(74) *Attorney, Agent, or Firm* — Perkins Coie LLP

(57) ABSTRACT

A media thickness detection system for inkjet printing applications monitors the thickness of media entering the printer to ensure correct printing performance by adjusting the position of the printheads on-the-fly to assure printing quality. Media that do have an acceptable printing thickness are passed through the printer without stopping operation of the printer transport and without being printed upon and are routed directly to a reject facility. Embodiments also prevent damage to the printer by immediately stopping operation of the printer when substrate thickness deviates significantly from an expected value due to variations in thickness that result from manufacturing tolerances or damage to the substrate.

26 Claims, 16 Drawing Sheets

PRINTER WITH HIGH PRODUCTIVITY MEDIA SCANNING

FIELD

Various of the disclosed embodiments concern increasing the productivity of inkjet printers when using materials of poor or inconsistent quality.

BACKGROUND

Various print media present a challenge for efficient print production. This is especially true for such media as corrugated cardboard, where tolerances for such factors as height can vary widely and where such media due to their nature are subject to warping and other deformation. When confronted with such variability in media height a printer may print some such media in a satisfactory manner because the height of such media is optimal for the printer while other such media may result in a low-quality print or, in some cases, may be of such thickness as to collide with the printheads or other portions of the printer mechanism, thus jamming and potentially damaging the printer. As a result, printer efficiency is impacted.

SUMMARY

Embodiments of the invention maintain consistent operation of a digital inkjet printer by reducing the requirements for media flatness. This prevents out of tolerance, warped, or damaged substrates from stopping the printing process in an inkjet printer and thus enhances robustness and productivity in real world conditions. To achieve the foregoing, several actions are executed when media thickness is measured at the printer and is determined to be out of specification. For example, when the media is of sufficient height to jam or damage the printer the print signal to the printheads is disabled, immediately stopping the printing process; the printheads are lifted to a safe position to avoid collision with the media; and when the media is of not of sufficient height to jam or damage the printer media but are sufficiently out of specification that they should not printed such media are rejected and routed to a reject facility instead of being stacked in line.

DETAILED DESCRIPTION

Figure 1:
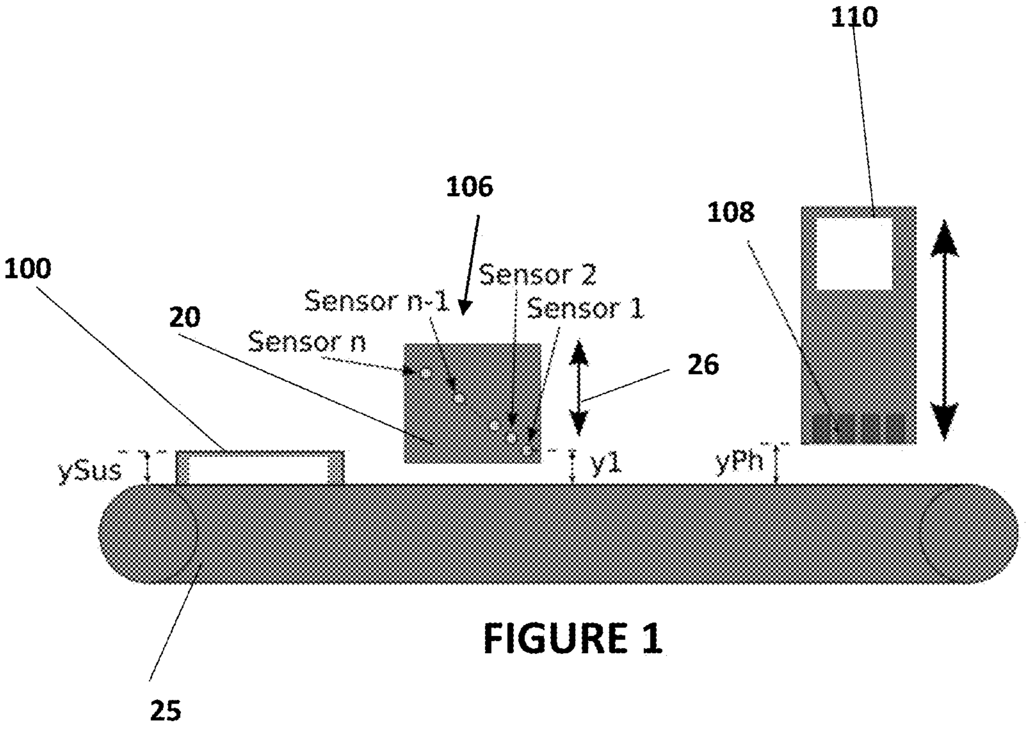
FIG. 1 shows a substrate height sensing arrangement according to an embodiment of the invention.

Embodiments of the invention provide a method and apparatus in which a digital inkjet printer processes media that are warped, deformed, and/or that have a variable thickness beyond that acceptable for quality printing. Operating the printer during production to manage a wide range of media height variations maximizes printer productivity by avoiding production stoppages that are due to warped or damaged media or media that otherwise does not conform to thickness tolerances.

Embodiments of the invention use one or several sensors to determine the highest point of each sheet of incoming media over a reference surface of the media transportation system, e.g. the upper surface of the conveyor belt of the printer and, based on the difference between the read value and the nominal media thickness, a control system determines if it is possible to keep the printer working.

If the media is too warped and there is physical risk for the printer, embodiments stop operation of the printer. If there is no collision risk, the system evaluates if adequate printing can be achieved or not.

If the media can be printed, embodiments adjust the height of the printheads to prevent interference with the media and thus keep the printheads within acceptable limits for adequate print quality relative to upper media surface distance.

If the media is too warped to be printed, the media is rejected without printing in a seamless manner after passing through the printer, without stopping or slowing down the production process. This results in maximum productivity for non-ideal media without negatively affecting the safety or productivity of the printer.

These actions avoid stacking substrates that have printing quality issues, save ink when the printheads are lifted, and reduce printer downtime. For example, by cancelling a print order when the detection system detects faulty media, the printheads stop the printing process. This means the printheads stop transferring ink through their ink nozzles. This avoids using ink for media that are inside the printer or that are just about to enter the printer, and that to be rejected subsequently due to low quality issues.

Print Quality

Print quality is related to the distance between the printheads and the substrate when the printheads are jetting the ink onto the substrate. The more distance between them, the lower the quality of the print. If the printheads are moved while printing, the quality can be affected and reduced. Because of that, the more common strategy is to allocate the printheads at a jetting gap distance with a balance between the quality and the need to move it because of a jam risk.

Sensor System

In embodiments, a print height detection system may be compounded by several photoelectric sensors, depending on the application this number varies from 3 to "n." Photoelectric sensors use light sensitive elements to detect objects and are made up of an emitter (light source) and a receiver.

There are many distinct types of light sensitive sensors:

direct reflection: emitter and receiver are housed together and use the light reflected directly off the object for detection;

Thru Beam: emitter and receiver are housed separately and detect an object when it interrupts the light beam between them; and retroreflective: emitter and receiver are housed together and requires a reflector, the light from the emitting element hits the reflector and returns to the light receiving element. An object is detected when it interrupts the light beam between the sensor and reflector.

For this application only Thru-Beam and Retroreflective sensors are valid, so performance does not depend on object's reflectivity properties for detection.

Sensor light beams are parallel to the printer transport belt surface, so it is possible to detect the highest thickness of the substrate whenever its position all along the width of the substrate as the substrate passes below the sensor block.

In embodiments detection with one sensor is also possible using CCD emitter-receiver sensors with a range of detection bigger than the maximum thickness of substrates admitted to the printer.

FIG. 1 shows a substrate height sensing assembly 106 according to an embodiment of the invention. The sensors are mechanically assembled in a unique support 20 such that vertical movement and their relative vertical position remains constant, i.e. relative sensor positions ($y_2$, $y_3$, . . . , $y_{(n-1)}$, $y_n$) on the support are not adjustable. The height sensing arrangement is mounted at the entry of the printer and before the printheads 108, where a substrate 100 entering printer's transport 25 is considered totally flattened. In embodiments, the height sensing assembly is a mechanical assembly that is vertically movable 26, such that its position may be adjusted by, for example tenth millimeter's, via a mechanical transmission system composed of a spindle, a gearbox, and a motor (not shown).

Due to its reduced dimensions and the low quantity of elements that the height sensing assembly requires, it may be retrofitted printers that are already in operation and working in the field. In such case, an easy mechanical refurbishment and an update of the industrial controller program is required.

Control System

There is a control system embedded in a programmable logic controller, henceforth called PLC, which manages all physical processes in the printer. Some of these physical processes are the electrical signals sent by sensors when they detect the substrate. Signals from each sensor are mapped into the embedded program. Connected to some of the digital inputs of the controllers, the information of the sensors arrives at the control system and actions can be taken with that information.

Each sensor relative position referenced to Sensor 1 is parameterized in the control system. The PLC adjusts the position of the motors, i.e. both the motor of the sensor block and the motor of the printhead assembly. The detection system is adjusted by the user with three main parameters: nominal board thickness, jetting gap distance, Sensor 1 offset and faulty media trigger sensor. All these parameters are configured by the user through a user interface application (see FIGS. 7A-7I).

Working Operation

Sensor 1 is the sensor that is used to detect the substrate entering the printer; the sensor defined as the faulty media trigger (Sensor n) is used to stop printing process immediately. The rest of sensors (Sensor 2 through Sensor n−1) are used to detect substrate thickness deviations and correct the printhead position to avoid media jams.

Calibration

Figure 2:
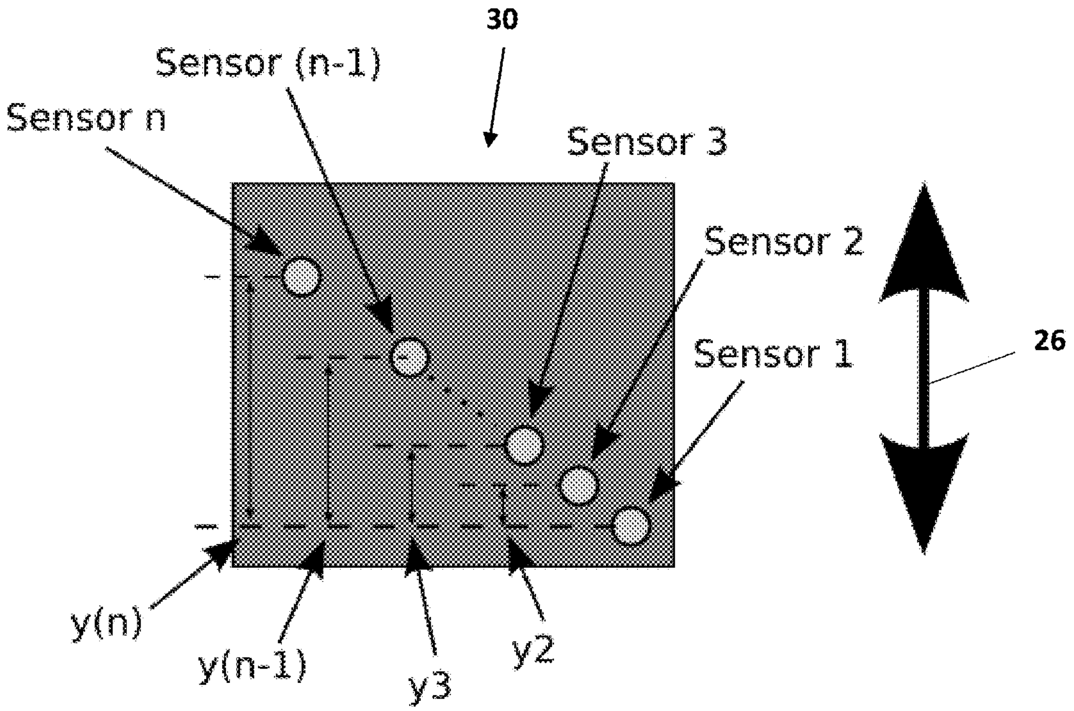
FIG. 2 shows an alignment plate for plurality of height sensors according to an embodiment of the invention.

FIG. 2 shows an alignment plate 30 for plurality of height sensors according to an embodiment of the invention. All sensors are positioned to project their light beam parallel to printer's transport surface, and consequently, parallel to substrate's surface. This calibration process is done mechanically. Prior to the printing process the printer's control system executes an alignment checking routine. The alignment plate is a template that is used for this purpose. It is located at a certain height on the reflector side. The template is a mechanical plate with mechanized holes that match the distances defined for each sensor on the mechanical support ($y_2$, $y_3$, . . . $y_{(n-1)}$, $y_n$).

In embodiments, a motor (not shown) moves the sensor support to the known template position and checks that light signals are detected by sensor's receivers, checking that the light beams are completely parallel all along the width of the printer and are at their predefined distance in vertical direction from Sensor 1.

Printhead Position

Detection system position depends on the substrate's thickness. When starting the printing process, the sensor's support is moved vertically to set Sensor 1 a certain distance (offset) below nominal substrate's thickness defined in printer's user interface:

$$y_1 = y_{Sus} - \text{Offset}$$

The printing process starts once Sensor 1 is positioned in $y_1$ and the printheads are positioned in printing position ($y_{pp}$), which depends on substrate's thickness and the jetting gap (Jp) defined in printer's user interface. It is calculated following the formula:

$$y_{pp} = y_{Sus} + Jp$$

While the printing process is going on, the detection system monitors sensor status and executes printhead position corrections when any of sensors from Sensor 2 to Sensor n−1 detects substrate deviations.

When one of the mentioned sensors detects substrate deviations, the required position to avoid a jam is defined ($y_{cp}$) by setting the height of the sensor immediately above the highest sensor of those that have detected the substrate, i.e. sensor "i" detects the substrate:

$$y_{cp} = y_{(i+1)} + y_1$$

The control system then sets the printhead position by selecting the highest position between $y_{pp}$ and $y_{cp}$:

$$y_{ph} = \text{MAX}(y_{pp}, y_{cp})$$

In case Sensor n detects the substrate, the printer's transport is stopped immediately to prevent the substrate from reaching the printheads. At the same time, printheads are raised to their highest position.

Embodiments

Figure 3:
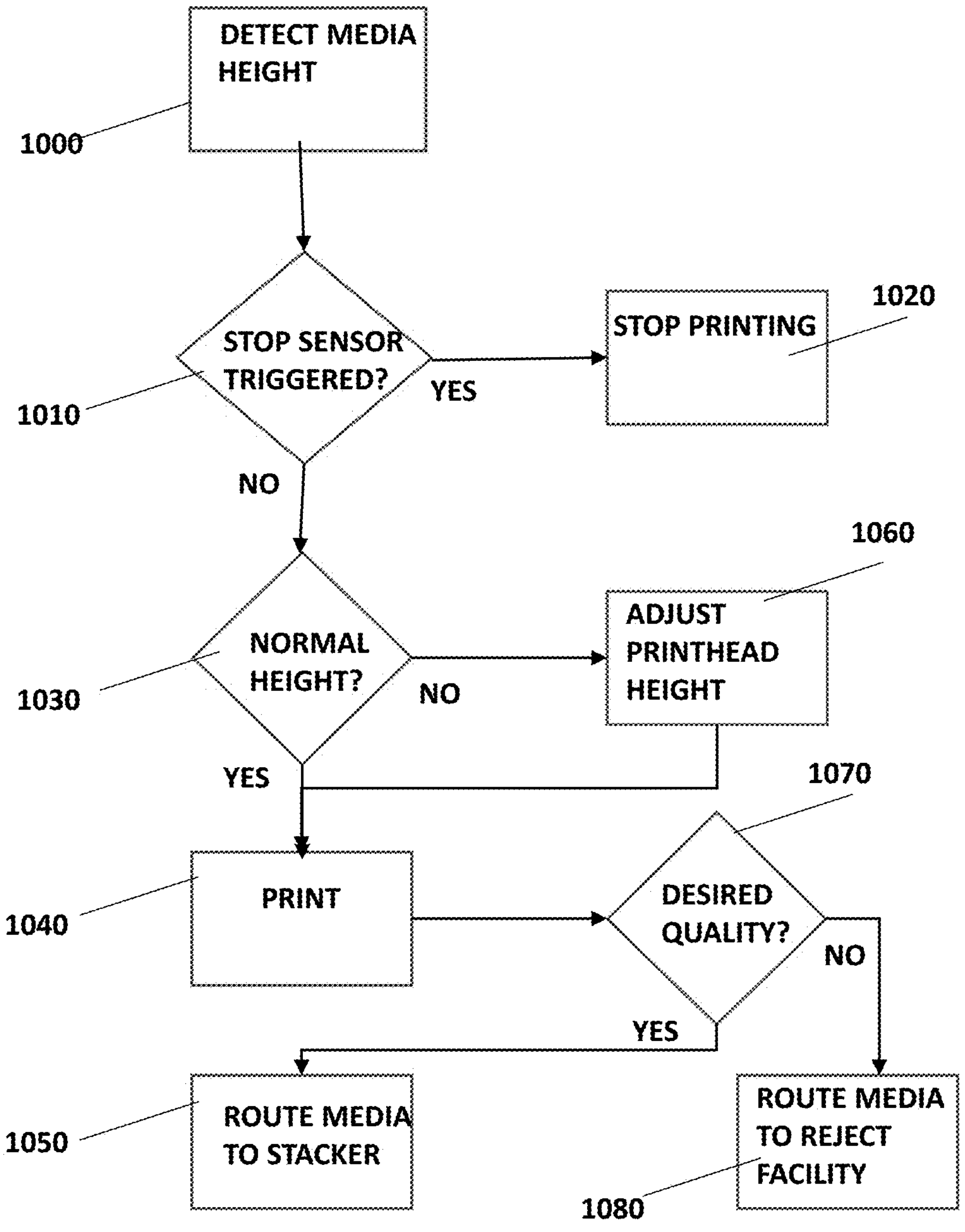
FIG. 3 is a flow diagram showing the operation of a printer with high productivity media scanning according to an embodiment of the invention.

FIG. 3 is a flow diagram showing the operation of a printer with high productivity media scanning according to an embodiment of the invention. In embodiments, media height measurement is performed by a plurality of digital sensors to detect the thickness of the media (1000)

In some embodiments, media detection is integrated into printers that have preexisting height detection systems and no additional sensor/reject mechanism is required over what is needed for machine protection/printing quality rejection.

The individual sensors also allow the detection of the quality of the media. In embodiments, detecting the presence of media with one sensor indicates that the media is a perfectly or near perfectly flat media (1030), whereas detecting a media with all but one sensor other than the stop sensor indicates that the media is a least acceptable printable media. If the stop sensor detects media entering the printer (1010), operation of the printer is stopped (1020), and the print bars are raised to prevent the media from crashing into the printer mechanism.

Information gathered by the detection system is not only used by the control system to adjust printhead position, reducing stop cases and therefore reducing downtime, or to stop the printing process when required to avoid the printheads getting damaged. It also serves to optimize the entire printing process by filtering unprinted and inferior quality printed boards (media) by switching them from a stacking flow, which ends with the boards being stacked and packed as valid product at the stacker zone, to the reject flow, which ends with boards being stacked at reject zone, where printer user may reuse the unprinted boards.

This process occurs in case the higher positioned of sensors configured to detect substrate thickness deviations detects a substrate, in which case the printheads then are positioned to the highest corrected position allowed ($y_{cp}=y_n+y_1$). At this position where the printheads are positioned too far from substrate's nominal thickness, printing quality is not decent enough to be considered to yield a valid final product and the media is rejected and routed to a reject facility.

To perform this process the PLC executes a board tracking process by detecting the board when it enters the printer, and then tracks the board along the line until it is finally rejected or stacked. The PLC calculates the board's position considering the printer's transport speed, the board's length, and the distance from the printer gate until the reject (1080) and stack zones (1050). Thus, if the last measuring sensor detects media and the stop sensor does not detect media, the printing bar is raised to a safe height above the stop sensor height. This allows the media to be routed through the printer to the reject facility without being printed and without damaging the printheads. In this way ink is saved because the printheads stop transferring ink through their ink nozzles. This avoids using ink for media that are inside the printer or that are just about to enter the printer, and that to be rejected subsequently due to low quality issues. In this way, interruption of printer operation is avoided, and potential damage to the printer is prevented.

If it is determined that the media can be printed properly, the printhead height is automatically adjusted to maintain the print quality of the production (1060). If the media is to be rejected, the print heads are moved to a safe position to avoid any crash with the media while it is rejected. When media that is not too warped to print is presented to the printer after media has been previously rejected, the printer automatically returns to production, positions the printheads for printing, starts printing the media (1040), and sends the printed media to the stacker (1050). In this way, every piece of media is examined for printability and potential to damage the printer. Printer operation is only stopped if the media has the potential to damage the printer. Otherwise, the printer continues to process media, whether the media is of printable quality, although only media of printable quality are printed.

In addition to assisting the thickness measurement sensors in determining the height of the media, the stop sensor also allows the printer to keep producing despite bad or warped media that have been introduced into the printer as long as the media would not damage the printer. If the stop sensor detects the potential for damage to the printer, it stops the printer (1020). If the other thickness measurement sensors detect media but the stop sensor does not, the printer continues to print on good media and reject bad media. Good media are printed and then routed to the stacker (1050); and bad media are not printed but are routed through the printer directly to the reject facility (1080).

When media is fed to the printer and the height of the media is determined by the thickness measurement sensors, the print bar adapts the printhead gap to maintain good image quality (1060). Here, the media are all printed and routed to the stacker, and none of the media are routed to the reject facility.

Figure 4:
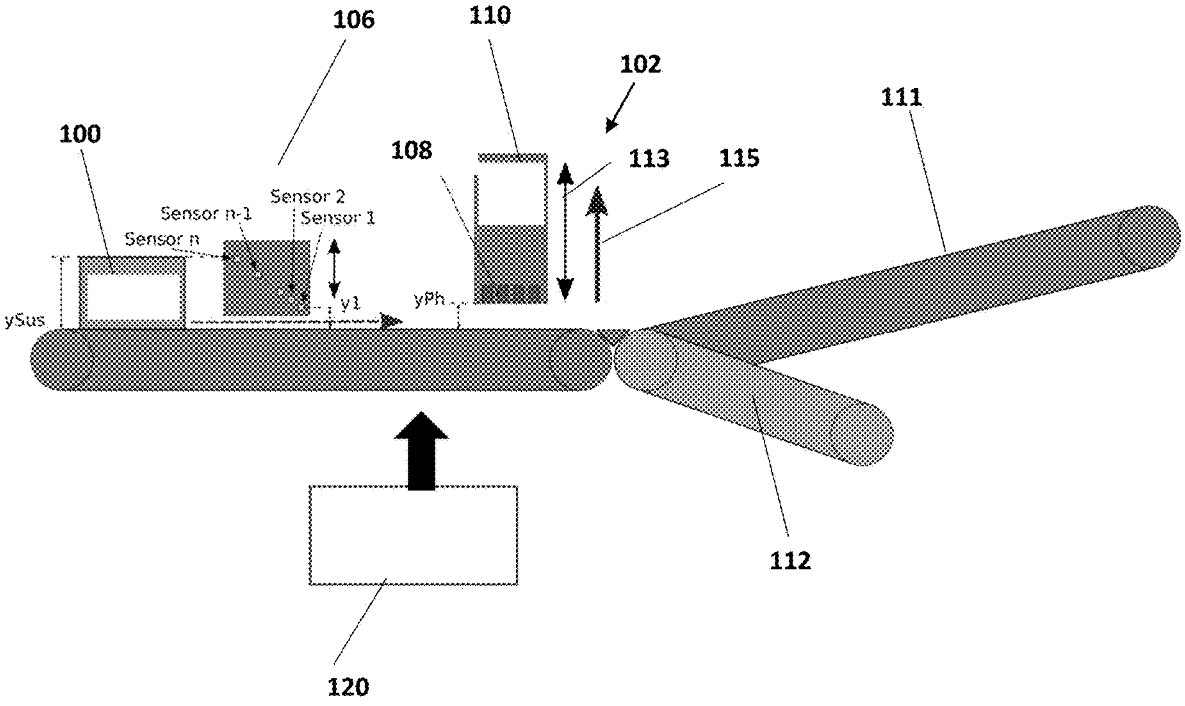
FIG. 4 shows a printer with high productivity media scanning according to an embodiment of the invention in which a media having a thickness of with risk of crash the printheads is presented for printing.
Figure 5:
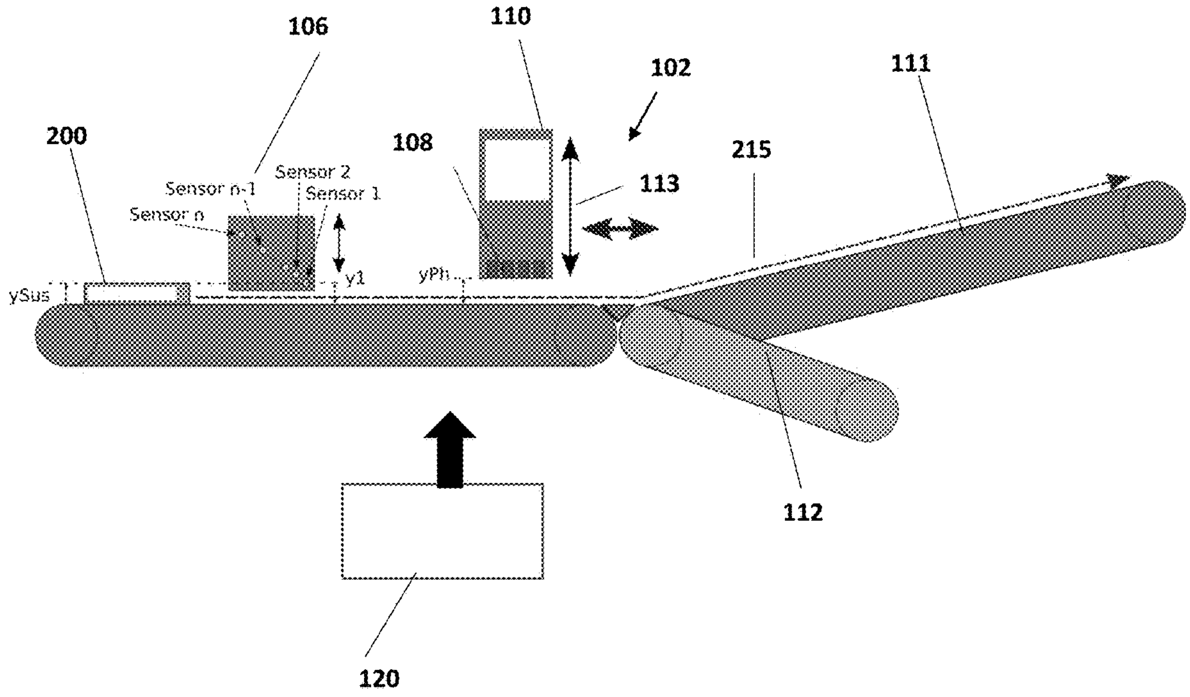
FIG. 5 shows a printer with high productivity media scanning according to an embodiment of the invention in which a media having a thickness of nominal board thickness is presented for printing.
Figure 6:
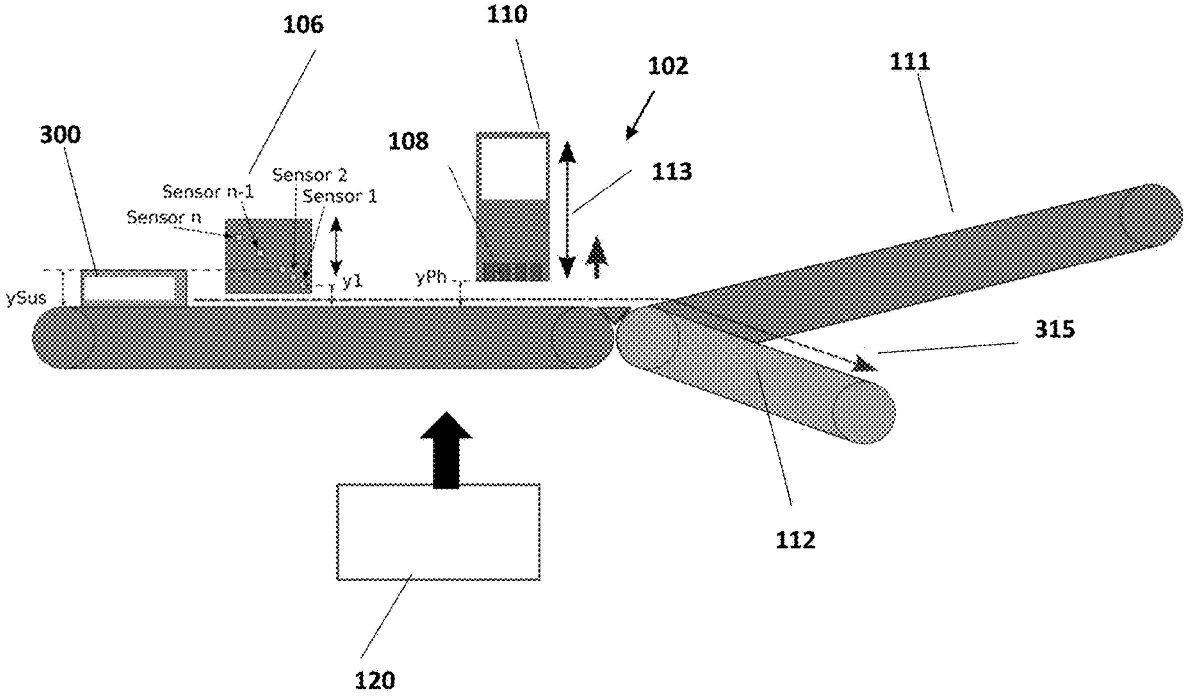
FIG. 6 shows a printer with high productivity media scanning according to an embodiment of the invention in which warp media not enabling a decent quality print is presented for printing.

In FIGS. 4-6, the following parameters are observed:

The nominal substrate's thickness is defined as $y_{Sus}$;

The value $y_1$ defines a predetermined distance (offset) below nominal substrate's thickness;

The printheads printing position is defined as $y_{pp}$, which depends on substrate's thickness $y_{Sus}$ and a jetting gap Jp;

The required position to avoid a printer jam is defined as $Y_{cp}$; and

The printhead position $y_{ph}$ is set to the highest position between $y_{pp}$ and $y_{cp}$.

FIG. 4 shows a printer with high productivity media scanning according to an embodiment of the invention in which media having a thickness with risk of crash is presented for printing.

In FIG. 4, media 100, such as a sheet of corrugated cardboard, is presented to a printer 102 which, in this embodiment, is a sheet-to-sheet single pass digital inkjet printer. In the example of this embodiment, the media has a nominal thickness (ySus) while the printer has an offset from the nominal substrate's thickness of 5 mm (y1) and a highest printhead position (yPh). The media thickness in FIG. 4 exceeds the highest printhead position, which creates the risk of the media crashing into the printheads.

The upstream printer path also includes several thickness sensors 106. For example, stop laser (Sensor n) is positioned upstream from the printer. The stop laser in this embodiment has a height detection threshold of 20 mm. In this embodiment, additional sensors (Sensor n−1, Sensor 2, and Sensor 1) detect various media thicknesses as determined when the detector assembly is built. Each of these sensors is arranged to provide signals via a control system 120 to the printer to control the height of the printheads 108 by raising or lowering 115 the print bars 110 up to the highest printhead position (yPh). Thus, when one or more sensors detect the presence of media a height adjustment signal is sent by the control system to the printer engine, where the height of the sensors relative to a reference surface, such as the printer transport belt, determines how much to raise the printheads when media is detected. Those skilled in the art will appreciate that both the stop sensor and the thickness sensors may be set to detect other thicknesses as desired and as appropriate for the media that are to be printed. In this embodiment, a first measuring sensor (Sensor 1) measures media thickness of 3.5 mm and a last measuring sensor (Sensor n−1) measures media thickness of 9.5 mm. These sensors define the range of acceptable media thickness within which printhead height is adjustable to produce acceptable prints.

In the embodiment of FIG. 4, the stop sensor senses that the media has a thickness that is greater than the detection threshold of 20 mm and, accordingly signals the printer to stop operation 115.

FIG. 5 shows a printer with high productivity media scanning according to an embodiment of the invention in which media having a thickness of 4 mm (ySus) is presented for printing.

In FIG. 5, media 200, such as a sheet of cardboard, is presented to the printer 102. In this example, the media has a thickness of 4 mm (ySus).

In the embodiment of FIG. 5, the printer has a media clearance of 5 mm relative to the printer carriage. Because the media height is such that a decent quality print may be made, the media is printed 200 and routed 215 to a stacker 111.

FIG. 6 shows a printer with high productivity media scanning according to an embodiment of the invention in which media having a thickness of 12 mm is presented for printing.

In FIG. 6, media 300, such as a sheet of cardboard, is presented to the printer 102. In this example, the media has a thickness of 12 mm (ySus). As noted, the stop laser (Sensor n) positioned upstream from the printer has a detection threshold of 20 mm; and the upstream printer path includes several additional thickness sensors 106 which, in this embodiment, detect various media thicknesses.

In the embodiment of FIG. 6, the printer has a printhead position of 23.5 mm (yPh). Media that exceed this clearance in height trigger the stop sensor to stop operation of the printer. The media thickness in this embodiment is greater than the height of the highest sensor, i.e. 9.5 mm but less than the stop sensor height, i.e. 20 mm. In such case a good quality print may not be made but it is not necessary to stop operation of the printer. As such, the media is not printed, and it is routed 315 directly to the reject facility 112.

FIGS. 7A-7I are screenshots that show operation of a printer with high productivity scanning according to an embodiment of the invention. In FIGS. 7A-7I the photocells are shown as photocells A-F. For purposes of the discussion herein, these photocells approximately correspond respectively to Sensor 1 to Sensor n in FIG. 1. Those skilled in the art will appreciate that the spacing and number of photocells/sensors is determined by the application to which the invention is put, e.g. the media, media variations in height, printer and printhead clearance, etc. Photocells A-F are mounted on the substrate height sensing assembly such that photocell A detects media, which nominally has a thickness of 3 mm. Photocells B-F are spaced from photocell A as follows: photocell B 1 mm, photocell C 2.5 mm, photocell D 4 mm, photocell E 5.5 mm, and photocell F 7 mm. These values may be adjusted by raising or lowering the substrate height sensing assembly, e.g. with the homing photocell motor in this embodiment, for example to adapt the printer to accept media having a different nominal substrate thickness or tor use of the invention on printers having a different printhead clearance and/or print bar arrangement.

Figure 7A:
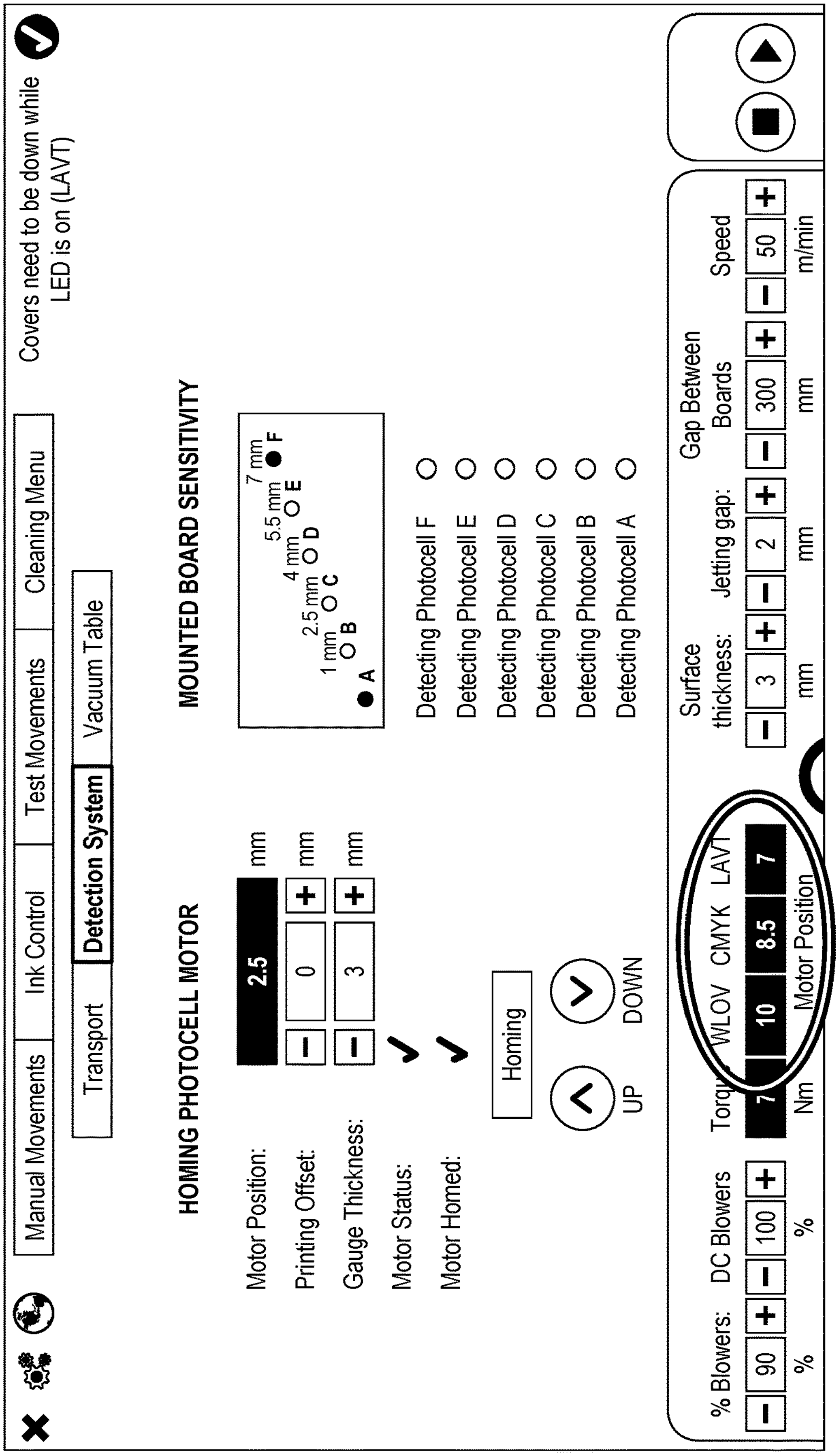
FIGS. 7A-7I are screenshots that show operation of a printer with high productivity scanning according to an embodiment of the invention.
Figure 7B:
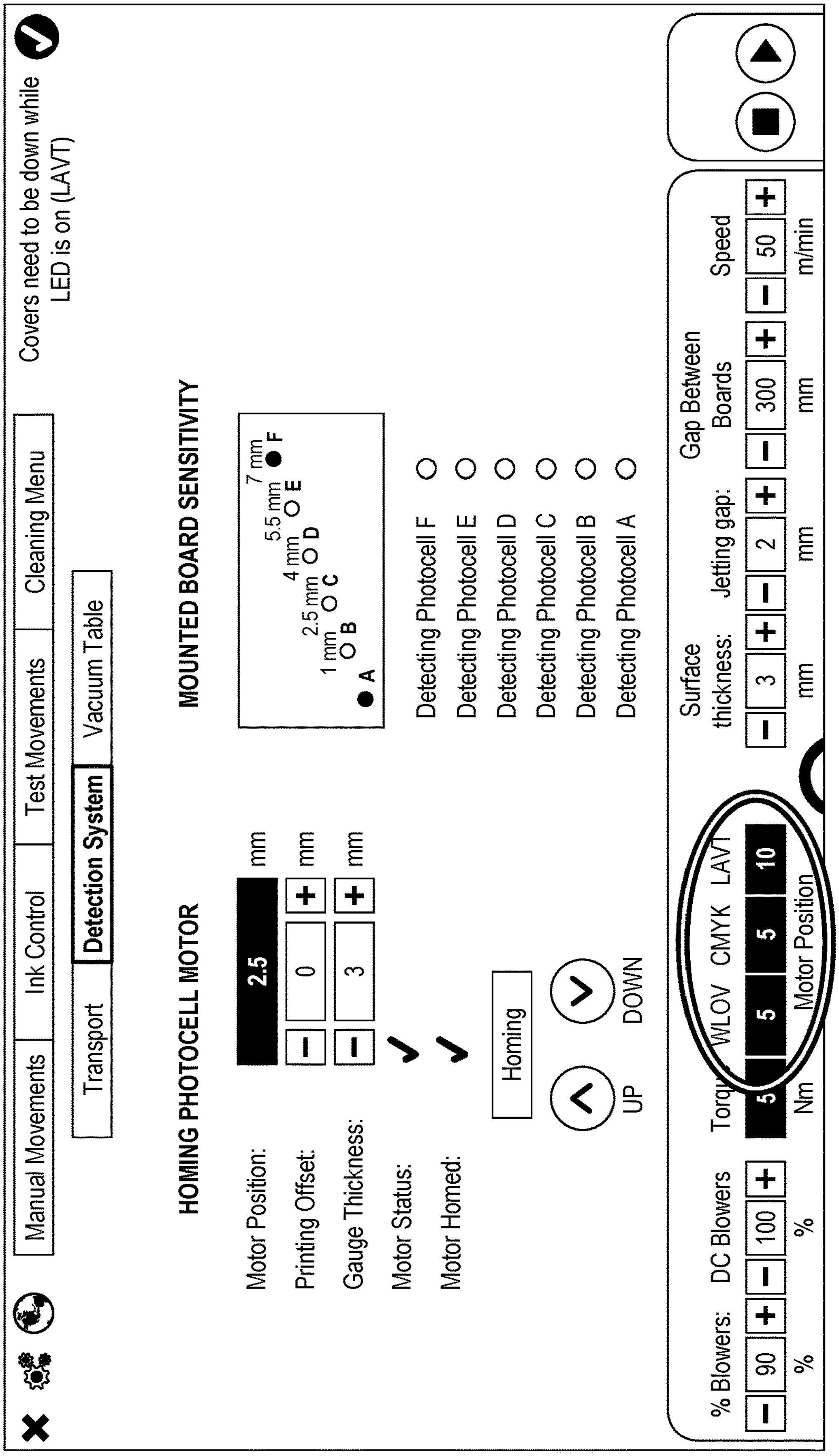
Figure 7C:
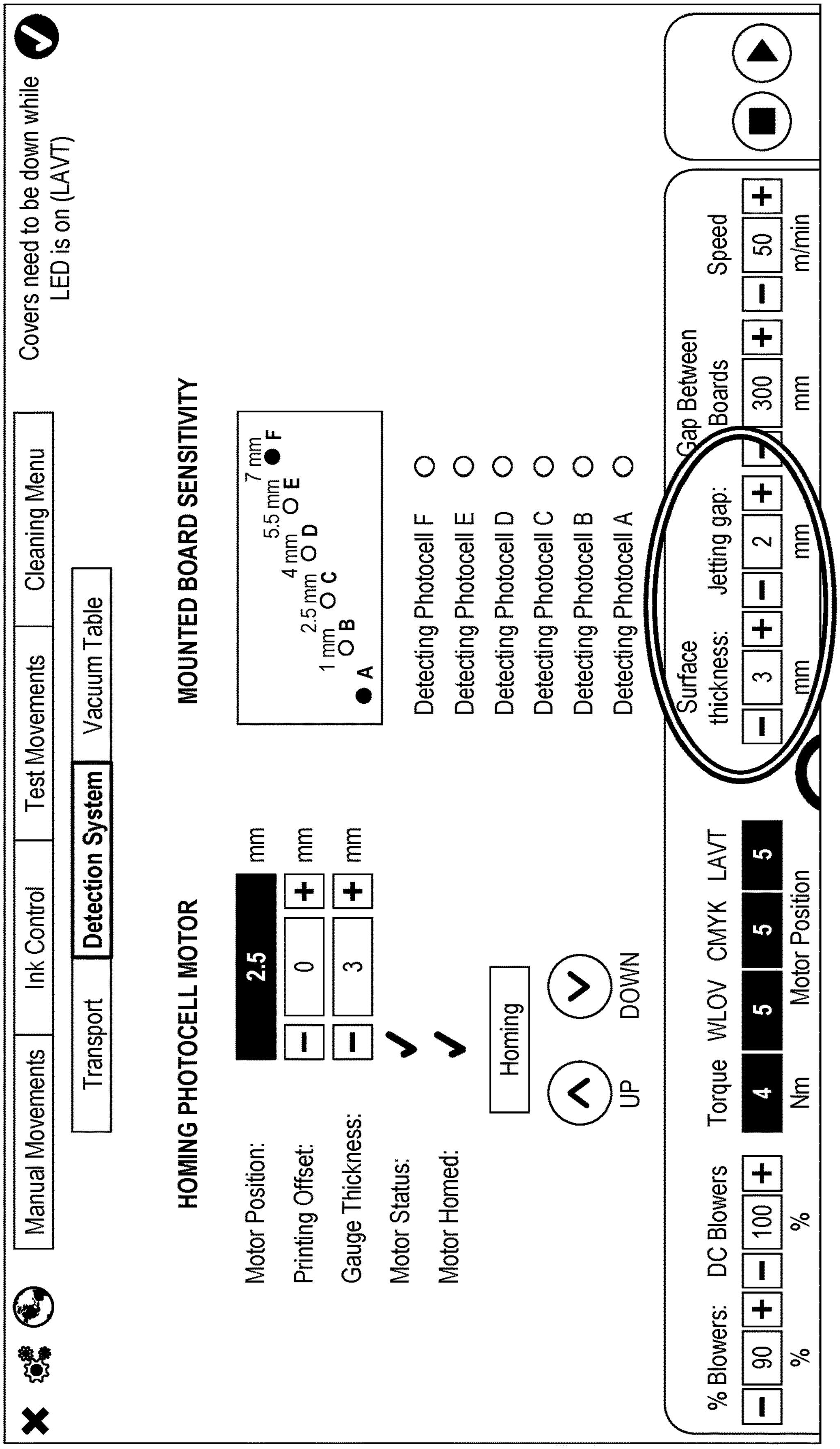
Figure 7D:
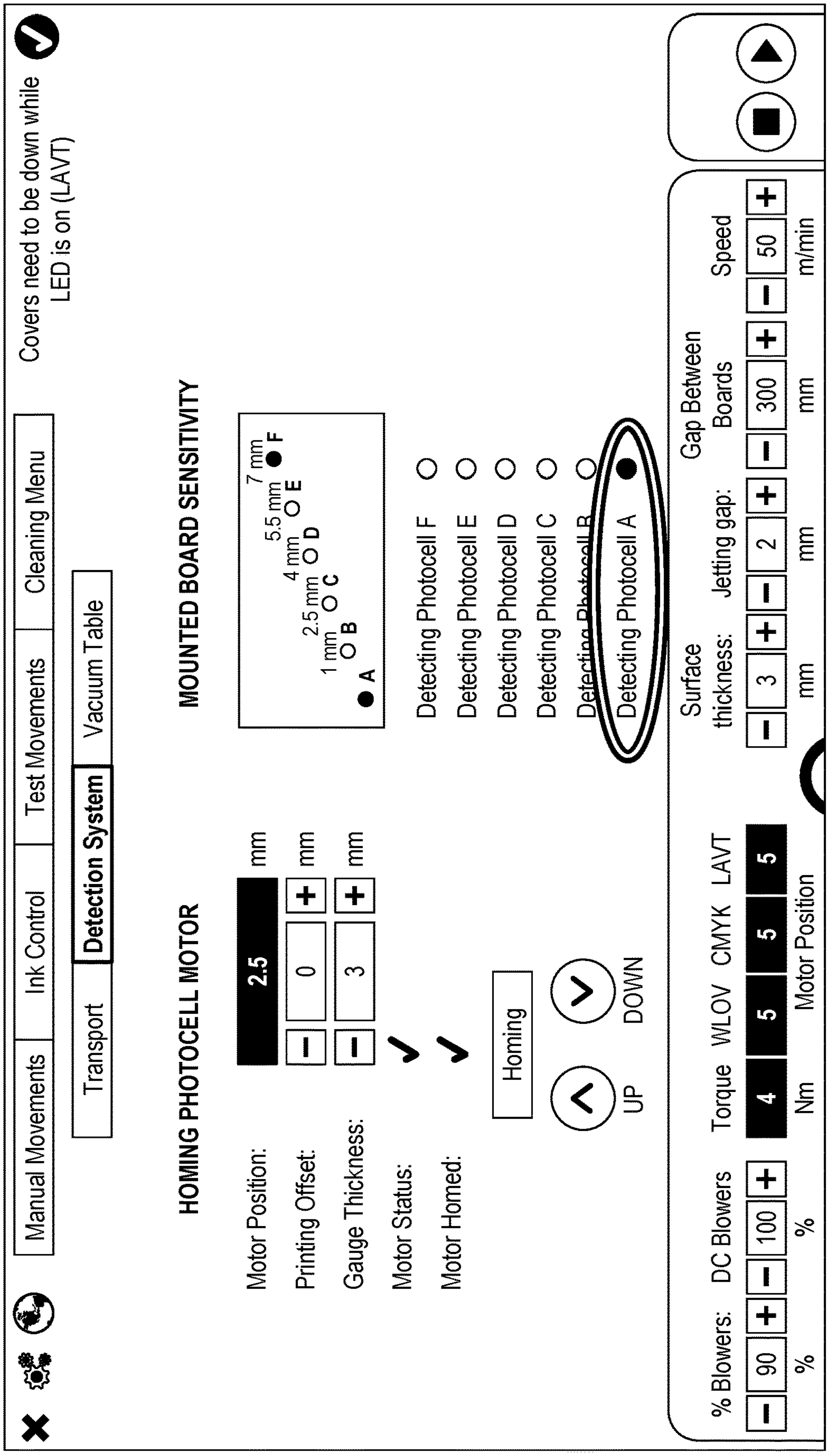
Figure 7E:
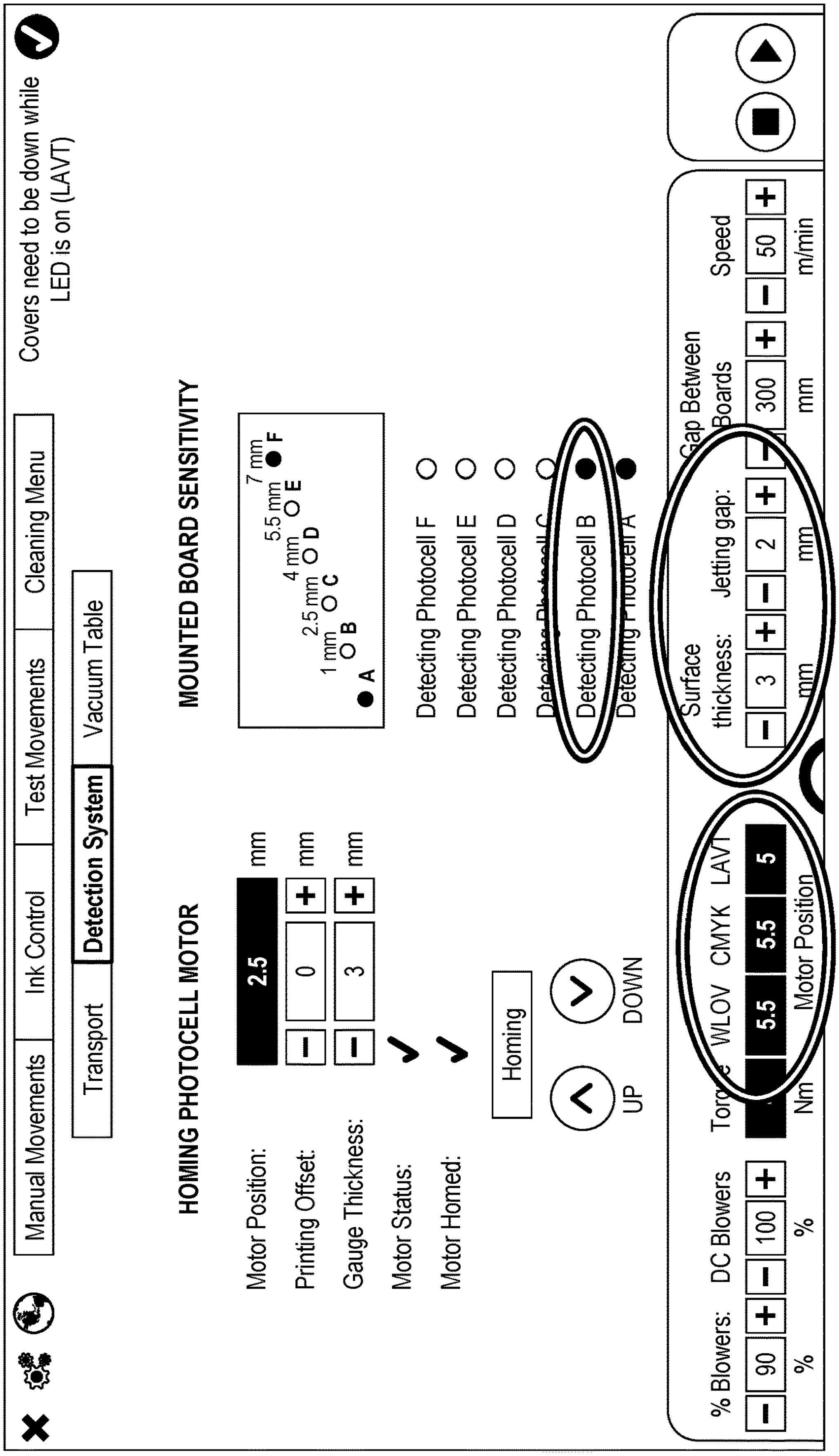
Figure 7F:
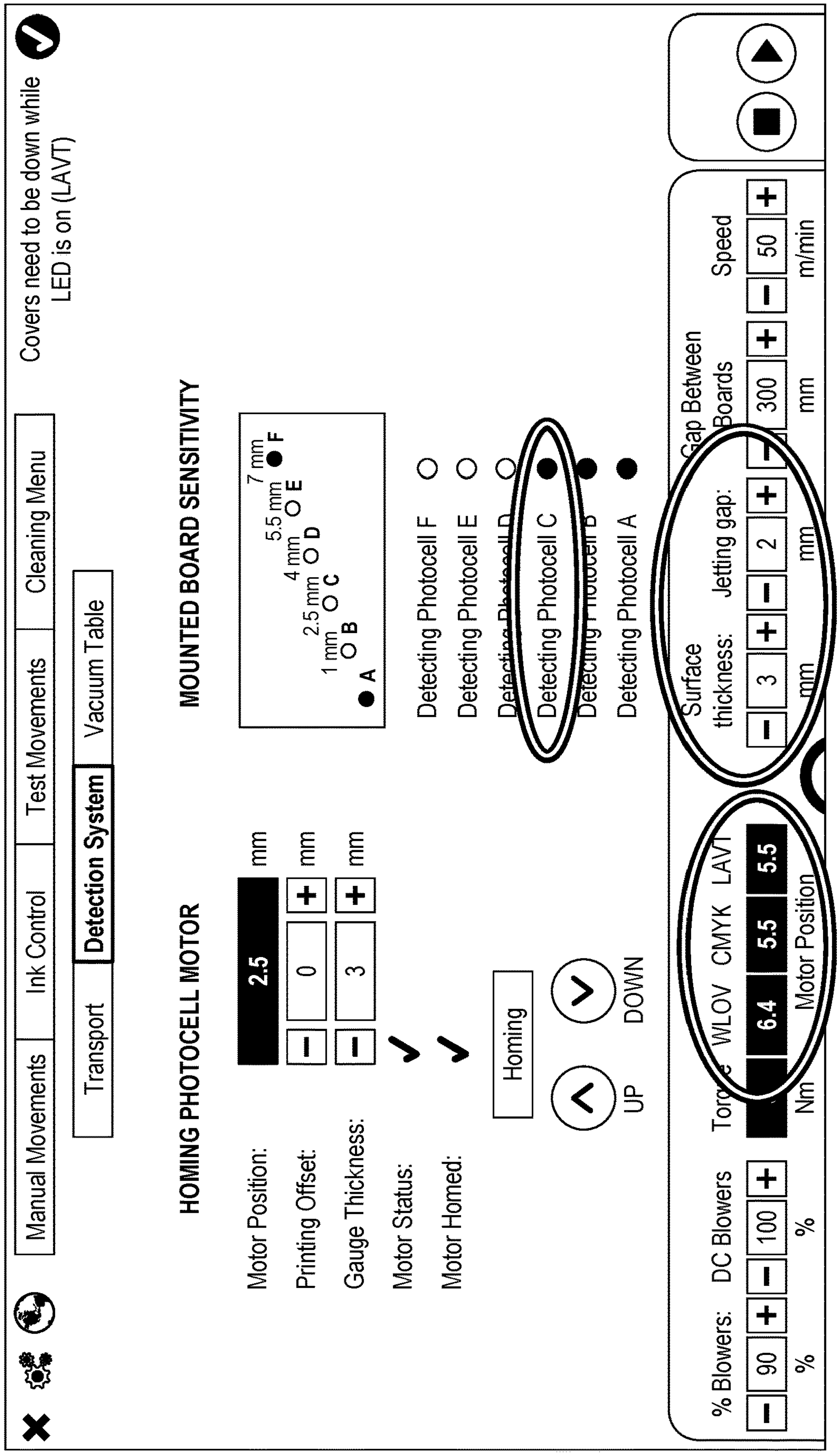
Figure 7G:
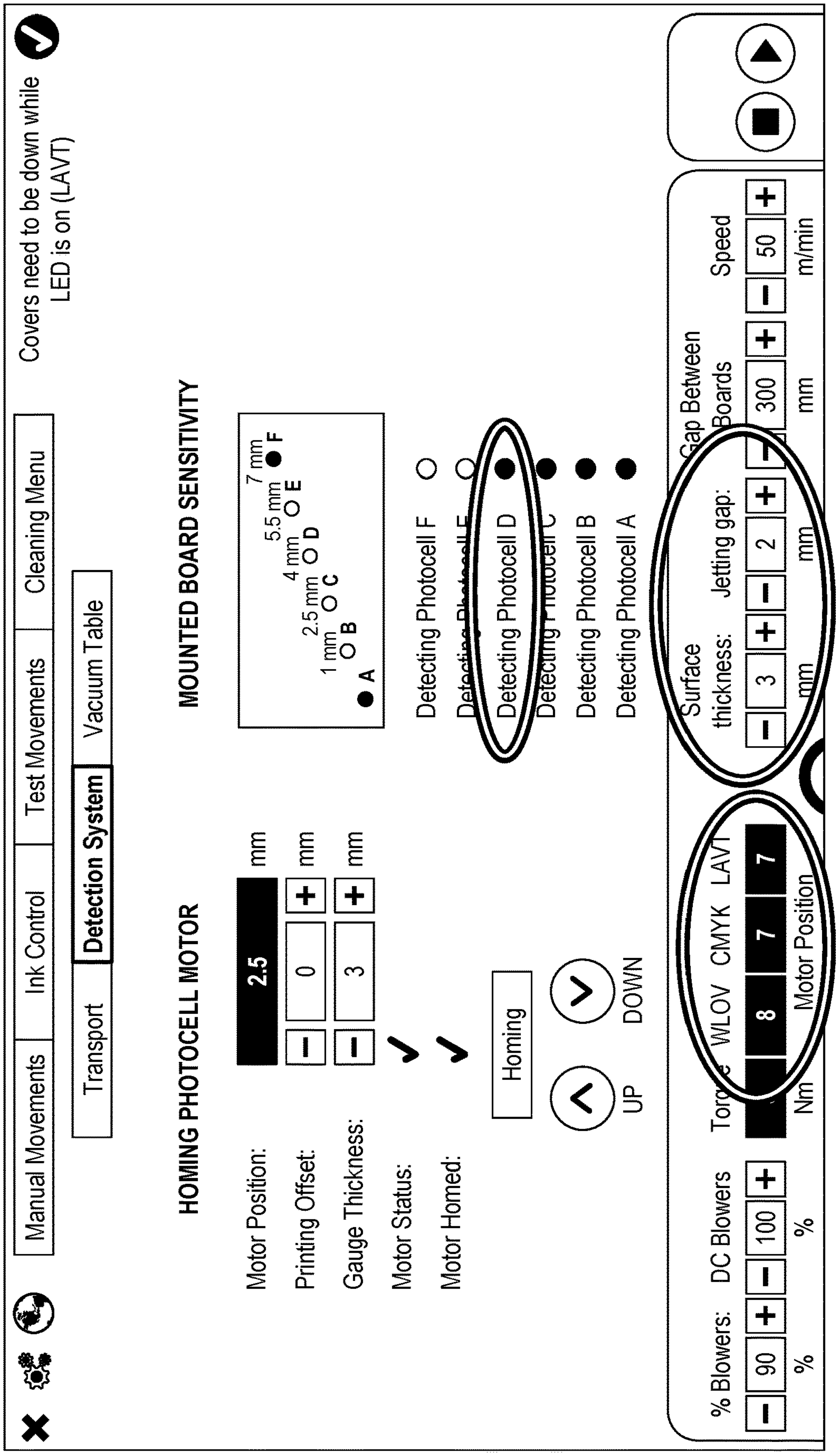
Figure 7H:
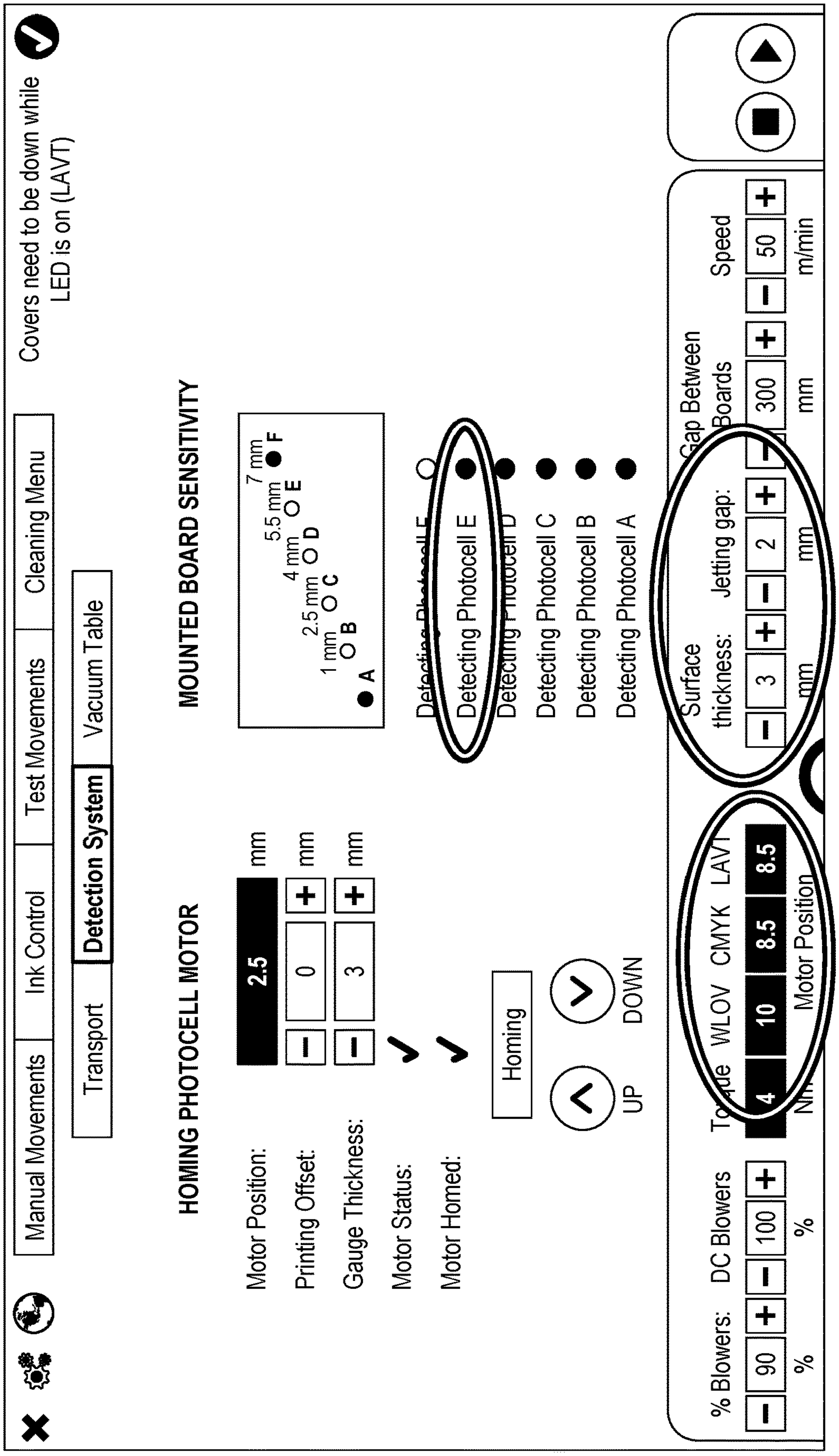
Figure 7I:
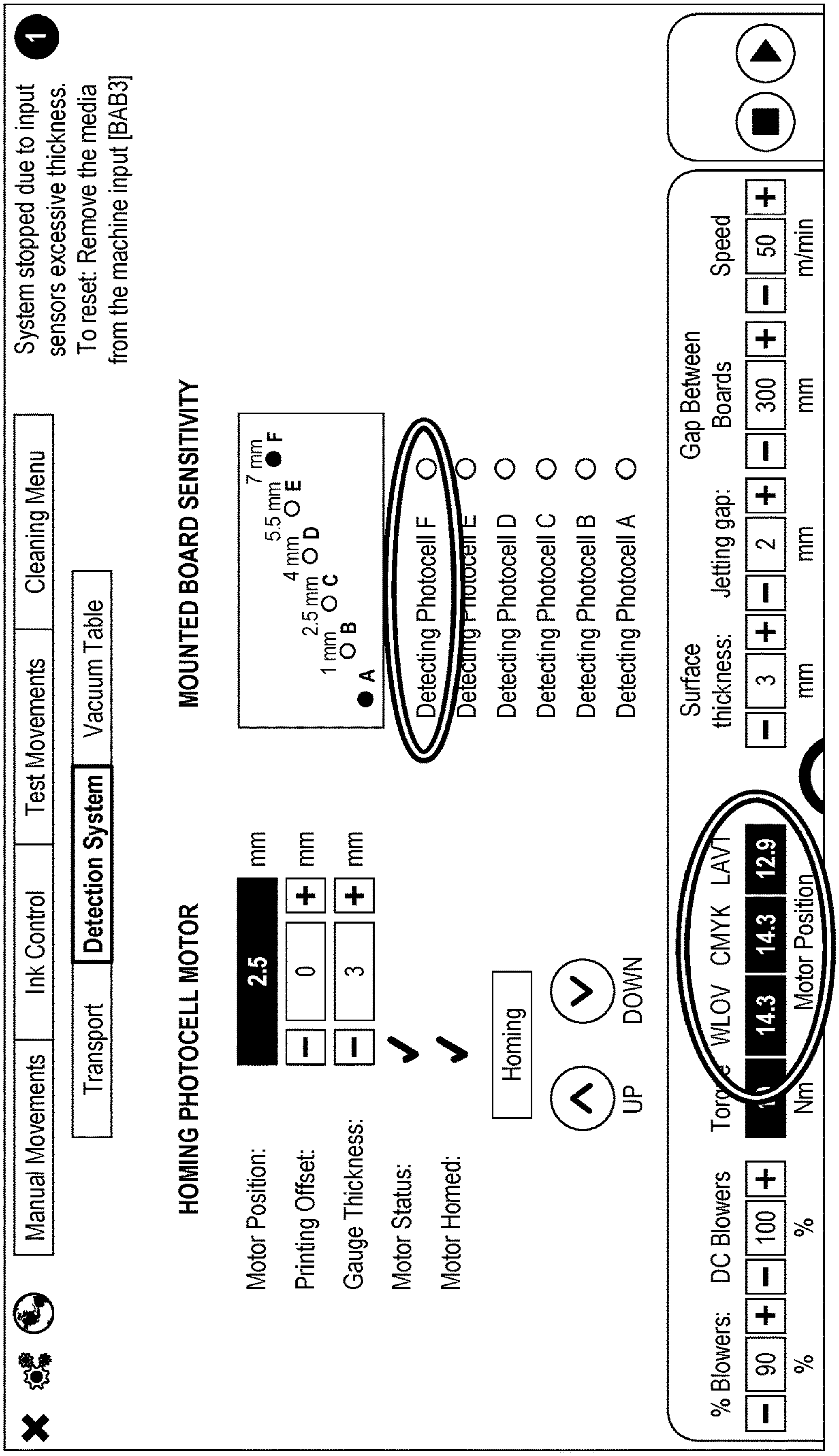

FIGS. 7A-7I show the following:

FIG. 7A shows a first step in which the print bars are positioned to a print mode (note the circled area at a lower left portion of the figure);

FIG. 7B shows that the printer transport belt is operating (note the circled area at a lower left portion of the figure);

FIG. 7C shows that the print bars are in a position (5 mm) the equals the expected surface thickness of the media and the inkjet jetting gap (note the circled area at a lower right portion of the figure);

FIG. 7D shows a starting test in which a photocell A is always ON to detect media (note the circled area at a middle right portion of the figure);

FIG. 7E shows detecting photocell B where the media thickness is between 4 and 5.5 mm, where 5.5 mm is equal to the surface thickness, in this example 3 mm, plus the distance to the next photocell C, i.e. 2.5 mm (note the circled areas at a lower left, lower right, and middle right portions of the figure); when the surface thickness plus the jetting gap are less than the surface thickness plus the next detected photocell height the print bars are moved to a safe position, while when the surface thickness plus the jetting gap are greater than the surface thickness and the next detected photocell height the print bars are not moved;

FIG. 7F shows operation of the detecting photocell C, where the media thickness is between 5.5 and 7 mm, and where the print bars are moved to a next safety position, where the surface thickness plus photocell D height equal 7 mm (note the circled areas at a lower left, lower right, and middle right portions of the figure);

FIG. 7G shows operation of the detecting photocell D, where the media thickness is between 7 and 8.5 mm, and where the print bars are moved to a next safety position, where the surface thickness plus photocell E height equal 8.5 mm (note the circled areas at a lower left, lower right, and middle right portions of the figure);

FIG. 7H shows operation of the detecting photocell E, where the media thickness is between 8.5 and 10 mm, and where the print bars are moved to a next safety position, where the surface thickness plus photocell F height equal 10 mm (note the circled areas at a lower left, lower right, and middle right portions of the figure); and FIG. 7I shows operation of detecting photocell F where the system stops, an alarm is triggered indicating excessive media thickness, and the print bars are raised, e.g. as indicated by the motor position (note the circled areas of the lower left=and middle right portion of the figure).

Processing System

Figure 8:
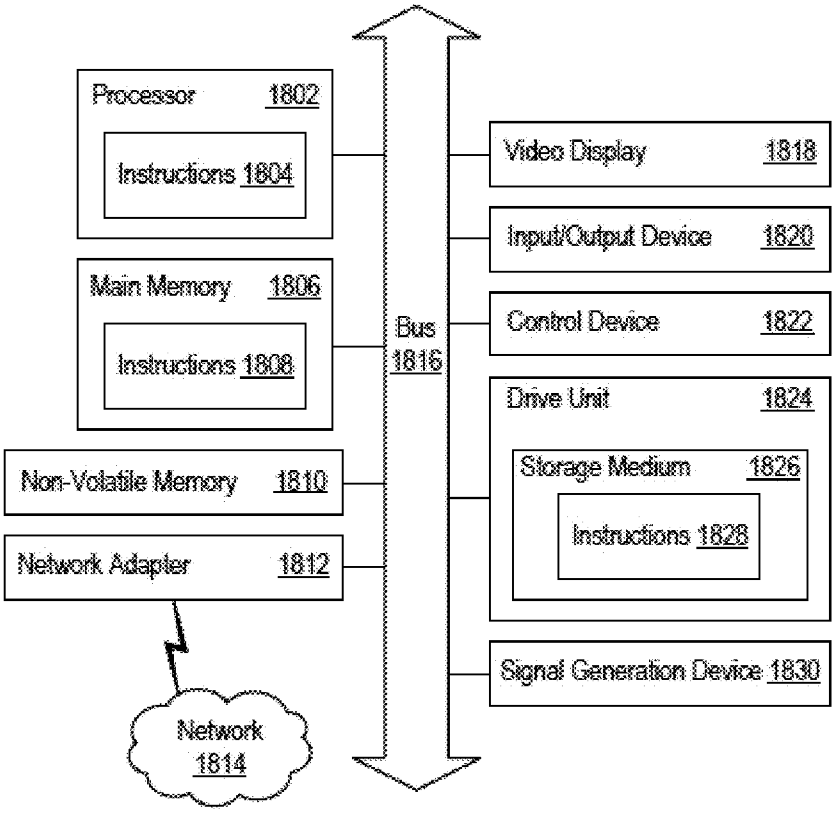
FIG. 8 is a block diagram illustrating an example of a processing system in which at least some operations described herein can be implemented.

FIG. 8 is a block diagram illustrating an example of a processing system 1800 in which at least some operations described herein can be implemented. For example, components of the processing system 1800 may be hosted on a computing device that includes a threat detection platform. As another example, components of the processing system 1800 may be hosted on a computing device that is queried by a threat detection platform to acquire emails, data, etc.

The processing system 1800 may include a central processing unit (also referred to as a "processor") 1802, main memory 1806, non-volatile memory 1810, network adapter 1812, e.g. a network interface, video display 1818, input/output device 1820, control device 1822, e.g. a keyboard or pointing device, drive unit 1824 including a storage medium 1826, and signal generation device 1830 that are communicatively connected to a bus 1816. The bus 1816 is illustrated as an abstraction that represents one or more physical buses or point-to-point connections that are connected by appropriate bridges, adapters, or controllers. The bus 1816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

The processing system 1800 may share a similar processor architecture as that of a desktop computer, tablet computer, mobile phone, game console, music player, wearable electronic device, e.g. a watch or fitness tracker, network-connected ("smart") device, e.g. a television or home assistant device, virtual/augmented reality systems, e.g. a headmounted display, or another electronic device capable of executing a set of instructions, sequential or otherwise, that specify actions to be taken by the processing system 1800.

While the main memory 1806, non-volatile memory 1810, and storage medium 1826 are shown to be a single medium, the terms "machine-readable medium" and "storage medium" should be taken to include a single medium or multiple media, e.g. a centralized/distributed database and/or associated caches and servers, that store one or more sets of instructions 1828. The terms "machine-readable medium" and "storage medium" shall also be taken to include any medium that can store, encoding, or carrying a set of instructions for execution by the processing system 1800.

In general, the routines executed to implement the embodiments of the disclosure may be implemented as part of an operating system or a specific application, component, program, object, module, or sequence of instructions, collectively referred to as "computer programs." The computer programs typically comprise one or more instructions, e.g. instructions 1804, 1808, 1828, set at various times in various memory and storage devices in an electronic device. When read and executed by the processors 1802, the instructions cause the processing system 1800 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the machine- or computer-readable media used to effect distribution.

Further examples of machine- and computer-readable media include recordable-type media, such as volatile and non-volatile memory devices 181810, removable disks, hard disk drives, and optical disks, e.g. Compact Disk Read-Only Memory (CD-ROMS) and Digital Versatile Disks (DVDs), and transmission-type media, such as digital and analog communication links.

The network adapter 1812 enables the processing system 1800 to mediate data in a network 1814 with an entity that is external to the processing system 1800 through any communication protocol supported by the processing system 1800 and the external entity. The network adapter 1812 can include a network adaptor card, a wireless network interface card, a router, an access point, a wireless router, a switch, a multilayer switch, a protocol converter, a gateway, a bridge, a bridge router, a hub, a digital media receiver, a repeater, or any combination thereof.

The network adapter 1812 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications, e.g. to regulate the flow of traffic and resource sharing between these entities. The firewall may additionally manage and/or have access to an access control list that details permissions including the access and operation rights of an object by an individual, a machine, or an application, and the circumstances under which the permission rights stand.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A printer, comprising:

a plurality of sensors positioned within a print path before a printhead location, said sensors generating a signal indicative of a highest point of incoming media relative to a reference surface;

a control system in communication with said sensors that, in response to receiving said sensor signals, determines when the height of the incoming media poses a collision risk to one or more portions of the printer at or near the printhead location or a damage risk to the printer;

said control system generating a signal that stops operation of the printer when the height of said incoming media poses the collision risk to the one or more portions of the printer or the damage risk to the printer;

said control system, in response to receiving said sensor signals, determining that the height of the incoming media does not pose the collision risk to the one or more portions of the printer or the damage risk to the printer;

said control system, in response to receiving said sensor signals, determining that the height of the incoming media does not allow acceptable printing of the media; and said control system generating a signal that rejects the media after the media is passed through the printer without being printed and without stopping or slowing down printer operation.

2. The printer of claim 1, further comprising:

said control system, in response to receiving said sensor signals, determining that the height of said incoming media does not pose the collision risk to the one or more portions of the printer or the damage risk to the printer;

said control system, in response to receiving said sensor signals, determining that the height of the incoming media allows acceptable printing of the media; and said control system generating a signal that operates the printer to print on the media.

3. The printer of claim 1, wherein said reference surface comprises a surface of a media transportation system and further comprises an upper surface of a printer conveyor belt.

4. The printer of claim 1, wherein the signal indicative of the highest point of incoming media is based on a difference between a read value and nominal media thickness.

5. The printer of claim 1, further comprising:

said control system, in response to receiving said sensor signals, determining that the height of the incoming media allows acceptable printing of the media; and said control system generating a signal that adjusts printhead height to prevent interference with the media and that keeps the printheads within acceptable limits for adequate print quality relative to an upper media surface distance.

6. The printer of claim 1, further comprising:

said control system, upon detecting the presence of media with a first sensor among the plurality of sensors, generating a signal that indicates that the media is a perfectly or nearly perfectly flat media.

7. The printer of claim 1, further comprising:

said control system, upon detecting the presence of media with all but one sensor other than a stop sensor, generating a signal that indicates that the media is a least acceptable printable media.

8. The printer of claim 1, further comprising:

said control system, upon detecting the presence of media with a stop sensor, generating a signal that stops operation of the printer.

9. The printer of claim 8, further comprising:

said control system, when the presence of media is detected with a stop sensor, generating a signal that raises the printer's print bars to prevent the media from damaging the printer.

10. The printer of claim 1, further comprising:

said control system, upon detecting the presence of media with all the sensors other than a stop sensor, generating a signal that indicates that the media is too warped to be printed properly; and said control system generating a signal that routes the media to a reject facility after the media passes through the printer without being printed.

11. The printer of claim 10, further comprising:

said control system, when the presence of media is detected with all the sensors other than a stop sensor, generating a signal that raises the printer's print bars to a sufficient height above the stop sensor height to prevent the media from damaging the printer.

12. A printer, comprising:

a plurality of sensors positioned within a print path before a printhead location, said sensors generating a signal indicative of a highest point of incoming media relative to a reference surface of a media transportation system;

a control system in communication with said sensors that, in response to receiving said sensor signals, determines if the height of the incoming media is such that the media can be printed properly;

said control system generating a signal that adjusts the printer printhead height relative to the height of the incoming media to maintain print quality;

said control system, in response to receiving said sensor signals, determining that the height of the incoming media is such that the media cannot be printed properly; and said control system generating a signal that routes the media to a reject facility after the media passes through the printer without being printed.

13. The printer of claim 12, further comprising:

said control system, in response to receiving said sensor signals, determining that the height of the incoming media is such that the media can be printed properly; and said control system generating a signal that routes the media to a stacker after the media is printed.

14. A method for operating a printer, comprising:

providing a plurality of sensors positioned within a print path before a printhead location;

said sensors generating a signal indicative of a highest point of incoming media relative to a reference surface;

providing a control system in communication with said sensors that, in response to receiving said sensor signals, determines when the height of the incoming media poses a collision risk with one or more portions of the printer at or near the printhead location or a damage risk to the printer;

said control system generating a signal that stops operation of the printer when the height of said incoming media poses the collision risk with the one or more portions of the printer or the damage risk to the printer; and when the height of the incoming media does not allow acceptable printing of the media, said control system generating a signal that rejects the media after the media is passed through the printer without being printed and without stopping or slowing down printer operation.

15. The method of claim 14, further comprising:

in response to receiving said sensor signals, said control system determining that the height of said incoming media does not pose the collision risk with the one or more portions of the printer or the damage risk to the printer; and the control system determining when the height of the incoming media allows acceptable printing of the media.

16. The method of claim 14, wherein said reference surface comprises a surface of a media transportation system and further comprises an upper surface of a printer conveyor belt.

17. The method of claim 14, wherein the signal indicative of a highest point of incoming media is based on a difference between a read value and nominal media thickness.

18. The method of claim 17, further comprising:

when the height of the incoming media allows acceptable printing of the media, said control system generating a signal that adjusts printhead height to prevent interference with the media and keep the printheads within acceptable limits for adequate print quality relative to an upper media surface distance.

19. The method of claim 14, further comprising:

when detecting the presence of media with one or more sensors, said control system generating a signal that indicates that the media is a perfectly or nearly perfectly flat media.

20. The method of claim 14, further comprising:

when detecting the presence of media with all but one sensor other than a stop sensor, said control system generating a signal that indicates that the media is a least acceptable printable media.

21. The method of claim 14, further comprising:

when detecting the presence of media with a stop sensor, said control system generating a signal that stops operation of the printer.

22. The method of claim 21, further comprising:

when the presence of media is detected with a stop sensor, said control system generating a signal that raises the printer's print bars to prevent the media from damaging the printer.

23. The method of claim 14, further comprising:

when detecting the presence of media with all the sensors other than a stop sensor, said control system generating a signal that indicates that the media is too warped to be printed properly; and said control system generating a signal that routes the media to a reject facility after the media passes through the printer without being printed.

24. The method of claim 23, further comprising:

when the presence of media is detected with all the sensors other than a stop sensor, said control system generating a signal that raises the printer's print bars to a safe height above the stop sensor height to prevent the media from damaging the printer.

25. A method for operating a printer, comprising:

positioning a plurality of sensors within a print path before a printhead location;

said sensors generating a signal indicative of the highest point of incoming media relative to a reference surface of a media transportation system;

in response to receiving said sensor signals, a control system in communication with said sensors determining when the height of the incoming media is such that the media can be printed properly;

said control system generating a signal that adjusts the printer printhead height relative to the height of the incoming media to maintain print quality;

in response to receiving said sensor signals, the control system determining that the height of the incoming media is such that the media cannot be printed properly; and the control system generating a signal that routes the media to a reject facility after the media passes through the printer without being printed.

26. The method of claim 25, further comprising:

in response to receiving said sensor signals, the control system determining that the height of the incoming media is such that the media can be printed properly; and the control system generating a signal that routes the media to a stacker after the media is printed.

* * * * *